US010689965B2

(12) United States Patent
Embid Droz et al.

(10) Patent No.: US 10,689,965 B2
(45) Date of Patent: Jun. 23, 2020

(54) FIELD DEVELOPMENT PLAN SELECTION SYSTEM, METHOD AND PROGRAM PRODUCT

(71) Applicants: Repsol, S.A., Madrid (ES); International Business Machines Corporation, Armonk, NY (US)

(72) Inventors: Sonia Mariette Embid Droz, Madrid (ES); Ruben Rodriguez Torrado, Madrid (ES); Mohamed Ahmed Hegazy, Heliopolis Cairo (EG); David Echeverria Ciaurri, Manhattan, NY (US); Bruno da Costa Flach, Copacabana (BR); Ulisses T. Mello, Blauvelt, NY (US); Davi Valladao, Sao Paulo (BR)

(73) Assignees: REPSOL, S.A., Madrid (ES); International Business Machines Corporation, Armonk, NY (US)

(*) Notice: Subject to any disclaimer, the term of this patent is extended or adjusted under 35 U.S.C. 154(b) by 995 days.

(21) Appl. No.: 14/299,770

(22) Filed: Jun. 9, 2014

(65) Prior Publication Data

US 2015/0058274 A1    Feb. 26, 2015

Related U.S. Application Data

(60) Provisional application No. 61/870,225, filed on Aug. 26, 2013.

(51) Int. Cl.
E21B 44/00    (2006.01)
E21B 49/00    (2006.01)
G06Q 10/06    (2012.01)

(52) U.S. Cl.
CPC ........... *E21B 44/00* (2013.01); *E21B 49/00* (2013.01); *G06Q 10/06* (2013.01)

(58) Field of Classification Search
CPC .......... E21B 44/00; E21B 49/00; G06Q 10/06
See application file for complete search history.

(56) References Cited

U.S. PATENT DOCUMENTS 3,033,460 A * 5/1962 Marcy ............... G06G 7/122
                                                 708/803
5,338,465 A * 8/1994 Lockhart ........... C07F 11/005
                                                 166/295

(Continued)

OTHER PUBLICATIONS

Kurc, et al., "A simulation and data analysis system for large-scale, data-driven oil reservoir simulation studies," Concurrency and Computation: Practice and Experience Concurrency Computat.: Pract. Exper. 2005; 17:1441-1467., 2005.*

(Continued)

*Primary Examiner* — Austin Hicks
(74) *Attorney, Agent, or Firm* — Law Office of Charles W. Peterson, Jr.; Louis J. Percello, Esq.; Joseph Petrokaitis, Esq.

(57) ABSTRACT

A system, method and computer program product for assessing field development plans selected based on a stochastic response surface, preferably, for hydrocarbon reservoir production. Assessment begins by assessing uncertainty associated with multiple decision variable configurations. A subset of realizations is selected. An individual surrogate is constructed for each subset realization. A reduced representative realization subset is determined, where the reduced subset is representative of the behavior/performance of all realizations of decision variable configurations.

18 Claims, 2 Drawing Sheets

(56) References Cited

U.S. PATENT DOCUMENTS

| | | | | |
|---|---|---|---|---|
| 6,549,879 | B1* | 4/2003 | Cullick | E21B 49/00 703/10 |
| 6,980,940 | B1* | 12/2005 | Gurpinar | E21B 43/00 166/250.16 |
| 7,467,045 | B2* | 12/2008 | Tabanou | G06Q 10/06 702/13 |
| 7,657,494 | B2* | 2/2010 | Wilkinson | E21B 43/00 706/13 |
| 8,005,658 | B2* | 8/2011 | Tilke | E21B 43/30 703/10 |
| 8,195,401 | B2* | 6/2012 | Ella | G06Q 10/06 702/13 |
| 2003/0011490 | A1* | 1/2003 | Bailey | E21B 47/12 340/853.3 |
| 2004/0133531 | A1* | 7/2004 | Chen | G06K 9/6298 706/8 |
| 2007/0276604 | A1* | 11/2007 | Williams | G01V 1/50 702/16 |
| 2008/0077371 | A1* | 3/2008 | Yeten | E21B 43/00 703/10 |
| 2009/0166033 | A1* | 7/2009 | Brouwer | E21B 43/00 166/250.02 |
| 2009/0299636 | A1* | 12/2009 | Carnegie | E21B 47/00 702/6 |
| 2010/0185427 | A1* | 7/2010 | Tilke | E21B 43/00 703/10 |
| 2011/0054797 | A1* | 3/2011 | Williams | G06F 17/18 702/13 |
| 2011/0288842 | A1* | 11/2011 | Gutierrez Ruiz | E21B 43/00 703/10 |
| 2011/0307230 | A1* | 12/2011 | Lee | E21B 41/00 703/10 |
| 2012/0130696 | A1* | 5/2012 | Davidson | E21B 43/00 703/10 |
| 2013/0185113 | A1* | 7/2013 | Culp | G06Q 10/06312 705/7.22 |
| 2013/0231901 | A1* | 9/2013 | Lu | E21B 43/30 703/1 |
| 2015/0058274 | A1* | 2/2015 | Embid Droz | E21B 49/00 706/52 |

OTHER PUBLICATIONS

D. J. Schiozer et al., "Risk Assessment for Reservoir Development Under Uncertainty," J. of the Braz. Soc. of Mech. Sci. & Eng., Apr.-Jun. 2004, vol. XXVI, No. 2, pp. 213-217, 2004.*

Suslick, S. B., et al. "Risk analysis applied to petroleum exploration and production: an overview." Journal of Petroleum Science and Engineering, 44 (1-2), pp. 1-9, 2004.

Bravo, et al. "State-of-the-Art Application of Artificial Intelligence and Trends in the E&P Industry: A Technology Survey," Proceedings of SPE Intelligent Energy, International Society of Petroleum Engineers, 2012.

Zabalza-Mezghani, et al., "Uncertainty management: From geological scenarios to production scheme optimization," Journal of Petroleum Science and Engineering, 44 (1-2), pp. 11-25, 2004.

Jorion, P. Value at Risk: The New Benchmark for Managing Financial Risk (p. 544). McGraw-Hill, 2000.

Romero, et al."Construction of response surfaces based on progressive-lattice-sampling experimental designs with application to uncertainty propagation," Structural Safety, 26 (2), pp. 201-219, 2004.

Nocedal, et al., Numerical Optimization (Springer Series in Operations Research and Financial Engineering) (p. 686). Springer, 2006.

* cited by examiner

FIELD DEVELOPMENT PLAN SELECTION SYSTEM, METHOD AND PROGRAM PRODUCT

CROSS REFERENCE TO RELATED APPLICATION

The present application claims benefit to provisional U.S. Application Ser. No. 61/870,225, "A SYSTEM AND METHOD TO ASSESS THE IMPACT OF PRODUCTION STRATEGIES UNDER GEOLOGICAL UNCERTAINTY" to Sonia Embid Droz et al., filed Aug. 26, 2013, assigned to the assignees of the present invention and incorporated herein by reference.

BACKGROUND OF THE INVENTION

Field of the Invention

The present invention is related to selecting a field development plan based on a stochastic response surface.

Background Description

A typical state of the art development plan selected for a hydrocarbon reservoir field provides production guidelines for a given planning horizon on a drilling schedule to maximize production, i.e., to recover reservoir contents. Thus, evaluating oil and gas production potential and economic performance over a wide range of alternate field development plans for a particular reservoir is crucial to making good decisions. When geological and petro-physical properties are known, expensive reservoir flow simulators can estimate production potential and economic performance to model any given reservoir for fairly precisely evaluating the reservoir over differing field development plan alternatives.

Normally however, available reservoir information is limited. Typically, the geological and petro-physical properties carry a quantifiable uncertainty. Consequently, major investment decisions normally are made on field development plan models that are based on this limited and uncertain information. To adequately characterize the risks associated with property uncertainties standard reservoir production models necessarily consider a large set of possible reservoir realizations across property ranges for the different properties. For example, different geological and petro-physical have property ranges that vary between best case, nominal and worst case, independently or semi-independently, of every other property. For a particular reservoir, a set of reservoir realizations and associated probabilities characterize the uncertainty associated with geological and petro-physical properties.

Consequently, arriving at a thorough evaluation of a large number of decision variables with an even larger set of reservoir realizations has been required for selecting a field development plan. Indeed evaluating all decision variable combinations and reservoir realizations using expensive reservoir simulations has been time-consuming and, frequently, an intractable activity. Moreover, ultimately selecting a single realization is somewhat arbitrary and does not appropriately reflect the geological and petro-physical uncertainty involved.

Typical risk metrics conservatively quantify economic performance using a worst case measure, e.g., Value at Risk (V@R). A typical economic performance metric is the Net Present Value (NPV), which is time varying and depends on oil and gas production profiles. Production profiles for determining NPV derive from decision variables in reservoir simulation. Since geological and petro-physical properties are different for each reservoir realization, the NPV evaluated at a given decision variable is uncertain and has a probability distribution defined by the reservoir realizations.

For example, a decision maker with a risk neutral attitude, an attitude of indifference to risk, may represent reservoir economic value for a specific field development plan as an average NPV over all reservoir realizations. By contrast another, risk averse decision maker, taking an extremely conservative approach, may represent the reservoir economic value for the same field development plan with the worst case NPV (maximum production for the minimum realizations) across all possible reservoir realizations. Thus, utility/risk measures representing the NPV valuation have depended on the risk attitude of the decision maker.

State of the art field development plan evaluation approaches have combined a set of statistical and mathematical tools, known in the art as Design of Experiments (DoE) and Response Surface Methodologies (RSM). In particular DoE identifies the most influential decision variables that affect reservoir response, and uses those decision variables to determine a representative set of candidate configurations. Initially, RSM began with choosing specific statistical/risk measures, e.g., expected value and standard deviation, to construct surrogates. Then, RSM iteratively constructs a surrogate reservoir from the DoE configuration set that approximates the reservoir as a system response within a region of interest. For example, before determining a surrogate for the standard deviation of NPV, RSM required the standard deviation for simulation results over all geological realizations for each candidate configuration of input decision variables. RSM fit those standard deviations to a mathematical model as a function of the decision variables. Thus, RSM used an aggregated approach to reflect both system performance and associated risk in surrogates. With each geological realization, however, the RSM model lost the specific response of that reservoir realization to the decision variables, which led to an inaccurate risk assessment for the reservoir.

DoE and RSM have been particularly useful where system response evaluation is computationally expensive, e.g., when evaluation requires complex reservoir flow simulations. Even so, because of the large number of expensive reservoir simulations to cover all potential combinations of reservoir realizations and decision variables may be intractable due to a possibly large number of reservoir realizations. Thus, evaluating the response for every different decision and analyzing each different reservoir realization, i.e., each input decision variable configuration, has required a large number of expensive, time consuming reservoir flow simulations. Frequently, this has proven to be intractable, especially where geological uncertainty has required a very large number of such evaluations.

An individual surrogate constructed for each selected geological realization captures the appropriate stochastic behavior of the response to decision-maker (oil company) risk preferences. Indeed, if the selected reservoir realizations are truly representative of the population and the surrogate accurately approximates the dynamic behavior of each selected realization, any descriptive statistics or even risk measures will be well approximate by surrogates constructed realization-wise. Even after selecting a surrogate, however, evaluating it is relatively inexpensive, consuming relatively little computing resources and costs to evaluate it. The surrogate may be searched relatively easily to identify a new candidate decision point for a potentially enhanced response. However, verifying surrogate accuracy has required re-simulating at each new point. Verified simulation results could be used for yet another iteration to further improve the surrogate. For these state of the art approaches, however, changing the objective function required re-starting, and constructing a new surrogate from the beginning, which has been time consuming and required significant and potentially prohibitively expensive resources. Still other state of the art approaches have evaluated every decision point (i.e., each distinct configuration of the decision variables) for every geological realization, using expensive reservoir simulations that carry high computational costs.

Thus, given volatility of results from the progressive nature of RSM surrogate construction combined with the subjective and changing nature of decision makers' attitudes to risk, there is a need for an approach to constructing reservoir surrogates that are independent of chosen risk measures.

SUMMARY OF THE INVENTION

A feature of the invention is selection of a representative set of reservoir realizations for construction of hydrocarbon reservoir surrogates that are insensitive to risk variation.

The present invention relates to a system, method and computer program product for assessing field development plans. Assessment begins by assessing uncertainty associated with multiple reservoir realizations. A subset of realizations is selected. An individual surrogate is constructed for each subset realization. A reduced representative realization subset is determined, where the reduced subset is representative of the behavior/performance of all realizations of the reservoir.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
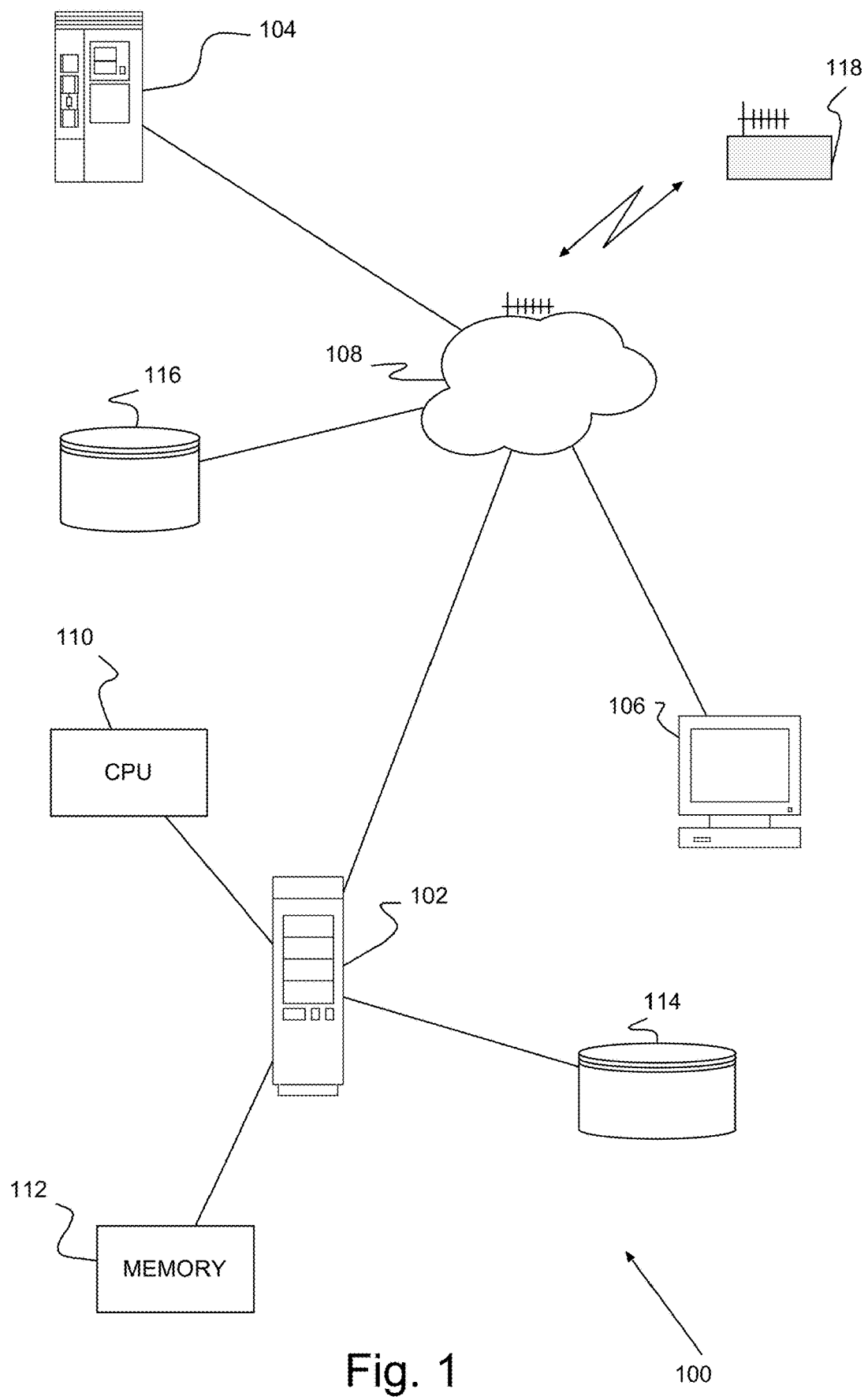
FIG. 1 shows an example of a stochastic response surface system for supporting decision-making for field development plan in hydrocarbon reservoirs, according to a preferred embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the drawings and more particularly, FIG. 1 shows an example of a stochastic response surface system 100, e.g., for modeling a reservoir in an economic model, according to a preferred embodiment of the present invention. When applied to a hydrocarbon reservoir, the preferred system 100 selects a representative subset from a complete set of realizations, wherein each realization is a geographically plausible model for the reservoir. Then, the preferred system 100 applies Design of Experiments (DoE) to sample decision variables and identify candidate configurations. From the candidate configurations the preferred system 100 constructs a corresponding set of surrogates and, using the surrogates, constructs a risk measure of the surrogates and selected configurations. The risk measure quickly arrives at a proper response approximation, and captures specific behavior each reservoir realization to risk of the reservoir realizations. Thus, the preferred system quickly provides a response approximation and, further, allows for evaluating under various/varying risks without extra iterations to update the approximation.

Preferably, the stochastic response surface system 100 includes one or more computers 102, 104, 106 (3 in this example), wired or wirelessly, coupled to, and communicating with, each other over a network 108. The network 108 may be, for example, a local area network (LAN), the Internet, an intranet or a combination thereof. Typically, the computers 102, 104, 106 include one or more processors, e.g., central processing unit (CPU) 110, memory 112 and local non-volatile storage 114. The system 100 may include additional storage, e.g., network connected storage 116, and sensors 118 remotely collecting data.

In particular, a preferred stochastic response surface system 100 provides a reduced, minimized number of surrogates, $f(x, \xi) \approx NPV(x, \xi)$ for evaluation to arrive at optimal results with reduced iterations, and to significantly lower computing time costs. The flexible surrogates allow risk evaluation without re-generating new surrogates under different risk conditions or parameters. Thus, the present invention measures the risk in the reservoir realizations to capture specific behavior of each reservoir realization, and to avoid subsequent surrogate re-construction when the decision maker changes the objective function.

Figure 2:
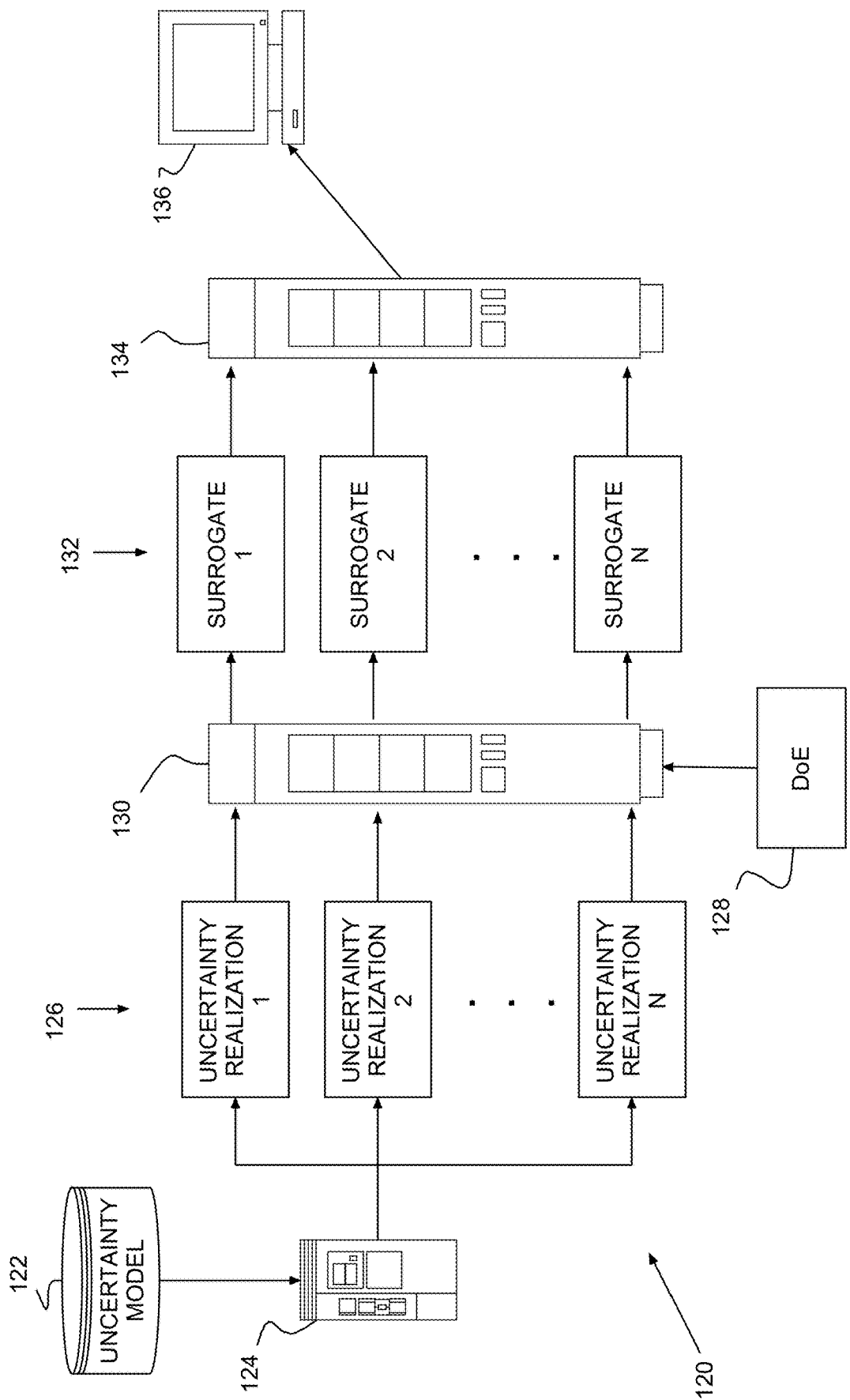
FIG. 2 shows an example of a stochastic response surface through a preferred system.

FIG. 2 shows an example of stochastic response surface generation workflow 120 through computers 102, 104, 106 of the system 100 of FIG. 1. An uncertainty model 122 characterizes the uncertainty for the random variables in plausible realizations. A sampling unit 124 or units, e.g., one or more of computers 102, 104, 106 in FIG. 1, samples the complete set to select a reduced subset 126 of N representative realizations from the uncertainty model 122. A Design of Experiments (DoE) unit 128 identifies candidate decision variable configurations for evaluation. A surrogate construction unit 130 determines system responses for the decision variable configurations over the range of feasible values to generate N corresponding surrogates 132 from the representative realization samples 126. A case selection unit 134 identifies a candidate decision from the surrogates 132 that, when applied under specific risk conditions, identifies and presents enhanced decision variable configurations 136.

The preferred system generates the decision variable configurations 136 without expensive evaluations previously required. Moreover, the decision variable configurations 136 are obtained using a stochastic response surface constructed from the uncertainty model 122 that support selecting the hydrocarbon field development plan. In particular, this support enhancement results from properly assessing the uncertainty from all different possible configurations of (input) decision variables, independently of any pre-defined risk measure.

Initially, a new reservoir may have a large set of N possible reservoir realizations $(\xi_j)$ 126 for M field development plans $(x_i)$, where $i=1, \ldots, M$ and $j=1, \ldots, N$. Net Present Value (NPV) expressed as the economic response as a function of a field development plan and reservoir realization has the form $NPV(x, \xi)$. Each realization 126 has a probability of occurrence characterized by $Pr(\xi=\xi_j)$. So, for a given field development plan each reservoir has an expected NPV, $E_\xi[NPV(x, \xi)]$.

The sampling unit 124 identifies a reduced subset of N realizations from the full set of initial set of realizations. First the sampling unit 124 may characterize any uncertainty in random variables, analytically or as a large random variable realization set. For hydrocarbon reservoirs, for example, uncertainty may be represented over static properties, such as porosity and permeability. The sampling unit 124 selects members for the subset that are representative of the behavior/performance of all plausible realizations and the original uncertainty.

The DoE unit 128 may use reservoir flow simulators on the identified set and subsamples the configuration design variables, $x \in X$, to evaluate different NPV values, $NPV(x,\xi)$, $\xi \in \Xi$. Thus, instead of an exhaustive enumeration of all decision variable configurations.

Preferably, the surrogate construction unit 130 captures the stochastic behavior of the reservoir in a respective individual surrogate from the representative realization subset. First, the surrogate construction unit 130 simulates well performance to determine responses associated with each decision variable configuration. Then, the surrogate construction unit 130 builds a stochastic surface for every selected uncertainty realization. The surrogate construction unit 130, for example computer 102 in FIG. 1, may build an interpolation or a regression model of the configurations as surrogates 132, $f(x, \xi) \approx NPV(x, \xi)$, using evaluated points as a training set.

Any risk measure, $\rho_\xi[f(x, \xi)]$, can be evaluated using the constructed surrogates 132, which represent the whole probability distribution of the response as a function of the decision variables involved. Then, a case selection unit 134 is defined from the surrogates 132 to determine risk based on differing statistical measures. Statistical measures considered for case selection may include, for example, maximizing average output, minimizing worst-case loss, minimizing standard deviation and/or any other associated risk measure that may be selected. Preferably, the case selection unit 134 applies search methods using the surrogates to determine an enhanced decision variable. From application of such solution algorithms to surrogates 132 before evaluating risk, arrives at a different decision variable configuration depending on risk attitude of the user without needing to re-run expensive evaluations (e.g., reservoir simulations) with each change in risk attitude, unlike prior approaches.

Advantageously, the preferred system generates a stochastic response surface (a different surrogate for each reservoir realization) to more accurately approximate the specific behavior of each plausible reservoir realization. In contrast previous approaches, such as RSM, the preferred system enhances decision-making under uncertainty, especially for hydrocarbon reservoirs. These prior approaches began with computing a risk measure, followed by constructing surrogates to obtain an aggregated result. The specific response of each reservoir realization was frequently unavailable to decision makers.

By contrast, the present invention constructs a surrogate for each of a representative set of realizations, before determining the risk measure to be optimized against. Thus, the present invention captures the specific behavior of each reservoir realization and avoids any surrogate re-construction, even if the decision maker changes the risk measure. Moreover, a preferred system 100 may use optimization techniques to search for additional field development plans for improved performance, flexibly and accurately improved, for a chosen measure (e.g. NPV), given any constraints on risk metrics, such as, constraints on the standard deviation.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of recovering reservoir contents based on a field development plan selection, said method comprising:
   receiving a description of a new reservoir having a plurality (K) of possible reservoir realizations ($\xi_i$);
   characterizing realization uncertainty in said plurality (K) of possible reservoir realizations, said plurality (K) being identified as including all plausible realizations and including all M decision variables determining field development plan ($x_i$), where i=1, ..., M and j=1, ... K;
   selecting a subset of representative reservoir realizations from said plurality (K) of possible reservoir realizations identified as including all plausible realizations, wherein selecting said subset selects N of said plurality (K) of possible reservoir realizations representative of all realizations, where N<K;
   constructing an individual surrogate response surface for each member of said subset, each constructed said individual surrogate capturing reservoir realization (Net Present Value (NPV)) specific behavior;
   applying a generic model to constructed surrogates to enhance decision variables and measure risk;
   identifying enhanced decision variables responsive to said generic model, wherein any surrogate re-construction is avoided;
   displaying field development plan configurations; and
   drilling said new reservoir on a drilling schedule according to a field development plan selected to maximize production.

2. A method of recovering reservoir contents as in claim 1, wherein
   constructing individual surrogate response surfaces constructs an individual surrogate $f(x, \xi) \approx NPV(x, \xi)$ for each realization of said subset; and
   applying said generic model applies said generic model to constructed surrogates $\rho_\xi[f(x, \xi) \approx NPV(x, \xi)]$ to enhance decision variables and measure risk.

3. A method of recovering reservoir contents as in claim 2, wherein each of said field development plan configurations comprises decision points for a decision variable set for reservoir production.

4. A method of recovering reservoir contents as in claim 3, wherein selecting said subset comprises:
   characterizing uncertainty in decision variables identified for each of said plurality of field development plan realizations; and
   identifying realizations representative of the behavior and performance of all of said field development plan configurations.

5. A method of recovering reservoir contents as in claim 4, wherein constructing said surrogates comprises:
   selecting a subset of decision variables; and
   evaluating for each representative realization, evaluation being NPV for the decision variable subset.

6. A method of recovering reservoir contents as in claim 5, wherein evaluating NPV comprises simulating said each realization and for each decision variable.

7. A system for recovering reservoir contents based on field development plans, said system comprising:
   a new reservoir description unit receiving descriptions of new reservoirs, each new reservoir having a set of representative reservoir realizations;
   a sampling unit selecting a realization subset of said set of representative reservoir realizations, said realization subset being representative of said set representative reservoir realizations;
   a Design of Experiments (DoE) unit determining responses for said realization subset to a selected group of decision variable configurations;
   a surrogate construction unit constructing a response surface for every realization of said realization subset from said determined responses, each response surface being a surrogate, each said surrogate capturing reservoir realization specific behavior;
   an optimization unit determining an optimization model from constructed said surrogates, said optimization unit characterizing a set of K possible realizations ($\xi_i$) for M decision variables ($x_i$), where i=1, ..., M and j=1, ..., K, said optimization unit selecting N realizations as said optimization model, where N<K, said optimization model representing said reservoir field over said complete range and being representative of the behavior and performance of all realizations responsive to risk, wherein surrogate re-construction is avoided; and
   a display displaying field development plan configurations, said each new reservoir being drilled on a drilling schedule according to a field development plan selected to maximize production, wherein at least one of said sampling unit, said DoE unit, said surrogate construction unit and said optimization unit is implemented in a computer.

8. A system as in claim 7, wherein, said decision variables including uncertainty limits for reservoir field properties, said set of decision variable realizations is a complete set of realizations representing said reservoir field over the complete range of uncertainties.

9. A system as in claim 7, wherein Net Present Value (NPV) is for each reservoir realization the economic response for each decision variable $NPV(x, \xi)$.

10. A system as in claim 7, said DoE unit selecting said group of decision variable candidate configurations responsive to economic constraints for a field.

11. A system as in claim 7, said surrogate construction unit:
simulating the selected decision variables for all realizations of said realization subset, each simulation determining a response associated with a selected decision variable configuration; and
building a stochastic surface for every selected uncertainty realization, Net Present Value (NPV), using responses $(f(x, \xi) \approx NPV(x, \xi))$ as a training set, wherein said surrogate construction unit captures the stochastic behavior of a hydrocarbon reservoir in a respective individual surrogate.

12. A system as in claim 7, indicating uncertainty in Net Present Value $(NPV(x, \xi))$ for each realization of said realization subset within the selected group of decision variable configurations as a measure of risk $\rho_\xi[f(x, \xi) \approx NPV(x, \xi)]$.

13. A computer program product for recovering reservoir contents based on field development plans, said computer program product comprising a non-transitory computer usable medium having computer readable program code stored thereon, said computer readable program code comprising:
computer readable program code receiving descriptions of new reservoirs, each new reservoir having a set of representative reservoir realizations;
computer readable program code characterizing decision variable uncertainty for a set of K possible realizations $(\xi_j)$ for M field development plans $(x_i)$, where i=1, . . . , M and j=1, . . . , K;
computer readable program code selecting a realization subset of N realizations of said set, where N<K, said realization subset representing said reservoir field over said complete range of said set;
computer readable program code determining a Net Present Value (NPV) for each reservoir realization as the economic response for each decision variable $NPV(x, \xi)$;
computer readable program code applying Design of Experiments (DoE) to determine responses for said realization subset to a selected group of decision variable configurations;
computer readable program code constructing a stochastic surface for every realization of said realization subset from said determined responses using production responses $(f(x, \xi) \approx NPV(x, \xi))$ as a training set, each stochastic surface being a surrogate, each said surrogate capturing reservoir realization specific behavior;
computer readable program code constructing a risk model responsive to constructed surrogates;
computer readable program code determining an optimization model from said constructed surrogates and said risk model, said optimization model being representative of the behavior and performance of all realizations of said complete set responsive to risk, wherein surrogate re-construction is avoided; and
computer readable program code displaying field development plan configurations, said new reservoir being drilled on a drilling schedule according to a field development plan selected to maximize production.

14. A computer program product as in claim 13, wherein said decision variables include uncertainty limits for properties for a reservoir field, and said set of decision variable realizations is a complete set of realizations representing said field over the complete range of uncertainties.

15. A computer program product as in claim 14, wherein said computer readable program code applying DoE comprises computer readable program code selecting said group of candidate configurations of decision variables responsive to economic constraints for a field.

16. A computer program product as in claim 15, said computer readable program code constructing stochastic surface comprises:
computer readable program code simulating well performance for all realizations of said realization subset, each simulation determining a production response associated with a selected decision variable configuration, and wherein each said stochastic surface captures the stochastic behavior of a hydrocarbon reservoir in a respective individual surrogate.

17. A computer program product as in claim 16, said optimization model indicates uncertainty in Net Present Value $(NPV(x, \xi))$ for each realization of said realization subset within the selected group of decision variable configurations as a measure of risk $[f(x, \xi) \approx NPV(x, \xi)]$.

18. A system for recovering reservoir contents based on field development plans, said system comprising:
a new reservoir description unit receiving descriptions of new reservoirs, each new reservoir having a set of representative reservoir realizations;
a sampling unit selecting a realization subset of said set of representative reservoir realizations, said realization subset being representative of said set;
a Design of Experiments (DoE) unit determining responses for said realization subset to a selected group of decision variable configurations;
a surrogate construction unit constructing a stochastic response surface for every realization of said realization subset using selected uncertainty realization responses $(f(x, \xi) \approx NPV(x, \xi))$ as a training set, each stochastic response surface being a surrogate, each said stochastic surrogate capturing reservoir realization specific behavior;
an optimization unit determining an optimization model from constructed said stochastic surrogates, said optimization unit characterizing a set of K possible realizations $(\xi_j)$ for M decision variables $(x_i)$, where i=1, . . . , M and j=1, . . . , K, said optimization model being representative of the behavior and performance of all realizations of said complete set responsive to risk, wherein surrogate re-construction is avoided; and
a display displaying said field development plan configurations, said each new reservoir being drilled on a drilling schedule according to a field development plan selected to maximize production, wherein at least one of said sampling unit, said DOE unit, said surrogate construction unit and said optimization unit is implemented in a computer.

* * * * *